United States Patent
Gu (10) Patent No.: US 11,117,631 B2
(45) Date of Patent: Sep. 14, 2021

(54) BICYCLE PARKING RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/020,828

(22) Filed: Sep. 15, 2020

(65) Prior Publication Data

US 2021/0139095 A1 May 13, 2021

Related U.S. Application Data (63) Continuation-in-part of application No. 16/680,494, filed on Nov. 12, 2019, now abandoned.

(51) Int. Cl.
*B62H 3/04* (2006.01)
*B62H 3/08* (2006.01)

(52) U.S. Cl.
CPC .............. *B62H 3/04* (2013.01); *B62H 3/08* (2013.01); *B62H 2700/00* (2013.01)

(58) Field of Classification Search
CPC ......... B62H 3/04; B62H 3/08; B62H 2700/00
USPC ........................................ 211/17, 18, 19, 22
See application file for complete search history.

(56) References Cited

U.S. PATENT DOCUMENTS

| | | | | |
|---|---|---|---|---|
| 557,470 A | * | 3/1896 | Young .................... | B62H 3/08 211/20 |
| 562,669 A | * | 6/1896 | Smart .................... | B62H 3/08 211/20 |
| 574,689 A | * | 1/1897 | Stover et al. .......... | B62H 3/08 211/20 |
| 585,917 A | * | 7/1897 | Lang ..................... | B62H 3/08 211/20 |
| 590,443 A | * | 9/1897 | Temple .................. | B62H 3/04 211/21 |
| D27,769 S | * | 10/1897 | Pine ...................... | D12/115 |
| 603,422 A | * | 5/1898 | Burkhardt ............. | B62H 3/00 211/22 |
| 620,863 A | * | 3/1899 | Wilcox .................. | B62H 3/04 211/21 |
| D201,143 S | * | 5/1965 | Vigilante .............. | D12/217 |

(Continued)

FOREIGN PATENT DOCUMENTS

| | | | | |
|---|---|---|---|---|
| CA | 1222722 A | * | 6/1987 | ............ B62H 3/04 |
| CA | 2507984 A1 | * | 11/2006 | ............ B62H 3/06 |

(Continued)

*Primary Examiner* — Stanton L Krycinski (57) ABSTRACT

A bicycle parking rack includes a rectangular base and at least two restriction members are connected to the base. Each restriction member includes two first sections and a connection section formed between the two first sections. Two support members are respectively connected between the at least two restriction members. Each support member includes a support portion and two connection portions which are formed on two sides of the support portion. The two connection portions are respectively connected to the two first sections of the at least two restriction members corresponding thereto. The support portion of each support member has a recess which accommodates a portion of a bicycle wheel. The restriction members of the bicycle parking rack restrict the bicycle wheel between the two restriction members.

7 Claims, 9 Drawing Sheets

(56) References Cited

U.S. PATENT DOCUMENTS

| | | | | |
|---|---|---|---|---|
| 3,455,461 | A | * | 7/1969 | Kesling ................... B62H 3/06 |
| | | | | 211/21 |
| 3,785,500 | A | * | 1/1974 | Kennelly ................. B62H 3/04 |
| | | | | 211/5 |
| 4,033,459 | A | * | 7/1977 | Zach ........................ B62H 3/10 |
| | | | | 211/20 |
| D245,596 | S | * | 8/1977 | Cohen .......................... D12/115 |
| D301,217 | S | * | 5/1989 | Mailhot ....................... D12/115 |
| 5,096,068 | A | * | 3/1992 | Theriault ................. B62H 3/04 |
| | | | | 211/20 |
| 5,133,461 | A | * | 7/1992 | Martinell ................. B62H 3/04 |
| | | | | 211/198 |
| D369,576 | S | * | 5/1996 | Johnson ....................... D12/115 |
| 6,062,396 | A | * | 5/2000 | Eason ....................... A47F 7/04 |
| | | | | 211/20 |
| 6,257,419 | B1 | * | 7/2001 | Kamysiak ................ B62H 3/00 |
| | | | | 211/22 |
| 6,868,976 | B1 | * | 3/2005 | Lassanske ................ B62H 3/08 |
| | | | | 211/21 |
| D507,511 | S | * | 7/2005 | Lassanske ..................... D12/115 |
| 6,948,621 | B1 | * | 9/2005 | Lassanske ................ B62H 3/06 |
| | | | | 211/21 |
| D583,716 | S | * | 12/2008 | Ross ............................ D12/115 |
| D602,403 | S | * | 10/2009 | Shaha .......................... D12/115 |
| 8,342,339 | B2 | * | 1/2013 | Cole ......................... B62H 3/04 |
| | | | | 211/22 |
| D719,491 | S | * | 12/2014 | Rayl ............................ D12/115 |
| D719,492 | S | * | 12/2014 | Rayl ............................ D12/115 |
| 8,905,245 | B2 | * | 12/2014 | Long ........................ B62H 3/04 |
| | | | | 211/20 |
| D778,788 | S | * | 2/2017 | Tsai ............................ D12/115 |
| 9,592,868 | B2 | * | 3/2017 | Greenblatt ............... B62H 3/04 |
| 9,610,993 | B1 | * | 4/2017 | Ho ............................ B62H 3/06 |
| 9,650,092 | B1 | * | 5/2017 | Tsai .......................... B62H 3/06 |
| D863,117 | S | * | 10/2019 | Rossiter ...................... D12/115 |
| 10,858,055 | B2 | * | 12/2020 | Drew ....................... B62H 3/04 |
| 2004/0251219 | A1 | * | 12/2004 | Zimmerman ........... B62H 3/08 |
| | | | | 211/17 |
| 2006/0266717 | A1 | * | 11/2006 | Tsai ......................... B62H 3/00 |
| | | | | 211/17 |
| 2015/0360739 | A1 | * | 12/2015 | Ashlag ................... B62H 5/005 |
| | | | | 29/426.2 |
| 2017/0120974 | A1 | * | 5/2017 | Peruzzo ................... B62H 3/08 |

FOREIGN PATENT DOCUMENTS

| | | | | | |
|---|---|---|---|---|---|
| CH | | 712798 | A2 | * | 2/2018 ............... B62H 3/04 |
| DE | | 29607760 | U1 | * | 7/1996 ............... B62H 3/04 |
| EP | | 1555194 | A1 | * | 7/2005 ............... B62H 3/04 |
| EP | | 3275771 | B1 | * | 4/2019 ............... B62H 3/08 |

* cited by examiner

BICYCLE PARKING RACK

BACKGROUND OF THE INVENTION

1. Fields of the Invention

The present application is a Continuation-In-Part application of applicant's former patent application with application Ser. No. 16/680,494, filed on Nov. 12, 2019.

2. Descriptions of Related Art

Conventionally, the bicycles are parked by using the kick stand which support the bicycle at an angle. The problem is that the bicycles easily fall down. The bicycle parking racks provide a bicycle parking place in an organized way, such as those disclosed in U.S. Pat. Nos. 8,905,245 and 9,592,868. The bicycle parking racks are designed to solve the problems of parking of high density of bicycles, and the bicycles are arranged in a row to efficiently use the parking space, and also to prevent the bicycles from falling.

The present invention is intended to provide a bicycle parking rack to restrict the bicycle wheel between the two restriction members of the parking rack, and to position the bicycle tires of different sizes.

SUMMARY OF THE INVENTION

The present invention relates to a bicycle parking rack and comprises a base which includes two opposite sides. The top face of each of the two opposite sides of the base includes a slot. At least two restriction members include two first sections and a connection section which is formed between the two first sections. The two first sections of each restriction member is connected to the base so that the connection section of each restriction member is located above the base. The connection section includes a first curved portion, a first extension portion, a second curved portion, a second extension portion and a third curved portion. The first curved portion is connected with a longer one of the two sections, and the third curved portion is connected to a shorter one of the two sections. The first extension portion, the second curved portion and the second extension portion forming a recessed area which prevents the brake systems or the quick-releases of bicycles from being hit by the connection section of the restriction members.

At least two support members are respectively connected between the at least two restriction members. Each support member includes a support portion and two connection portions which are formed on two sides of the support portion. The two connection portions are respectively connected to the two first sections of the at least two restriction members corresponding thereto. A bottom edge of the at least two support members is inserted into the slot in each of the opposite sides of the base and contacts the base. Each support member includes a first face and a second face which is located opposite to the first face. The first and second faces are not a continuous planar face. The second face includes a recessed zone formed in the first face, and the recessed zone forms a protrusion from the second face so as to reinforce the strength of the support member. The support portion of each support member having a recess which is adapted to accommodate a portion of a bicycle wheel.

The base is made of metal tubes which are modulated and can be easily assembled. The number of the restriction members can be adjusted according to practical needs.

The restriction members each are made of metal tubes which are bent at multiple positions so as not to interfere bicycle parts such as the brake pads or calipers.

The recesses of the support members of the bicycle parking rack are designed to accommodate the bicycle wheels of different widths and sizes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
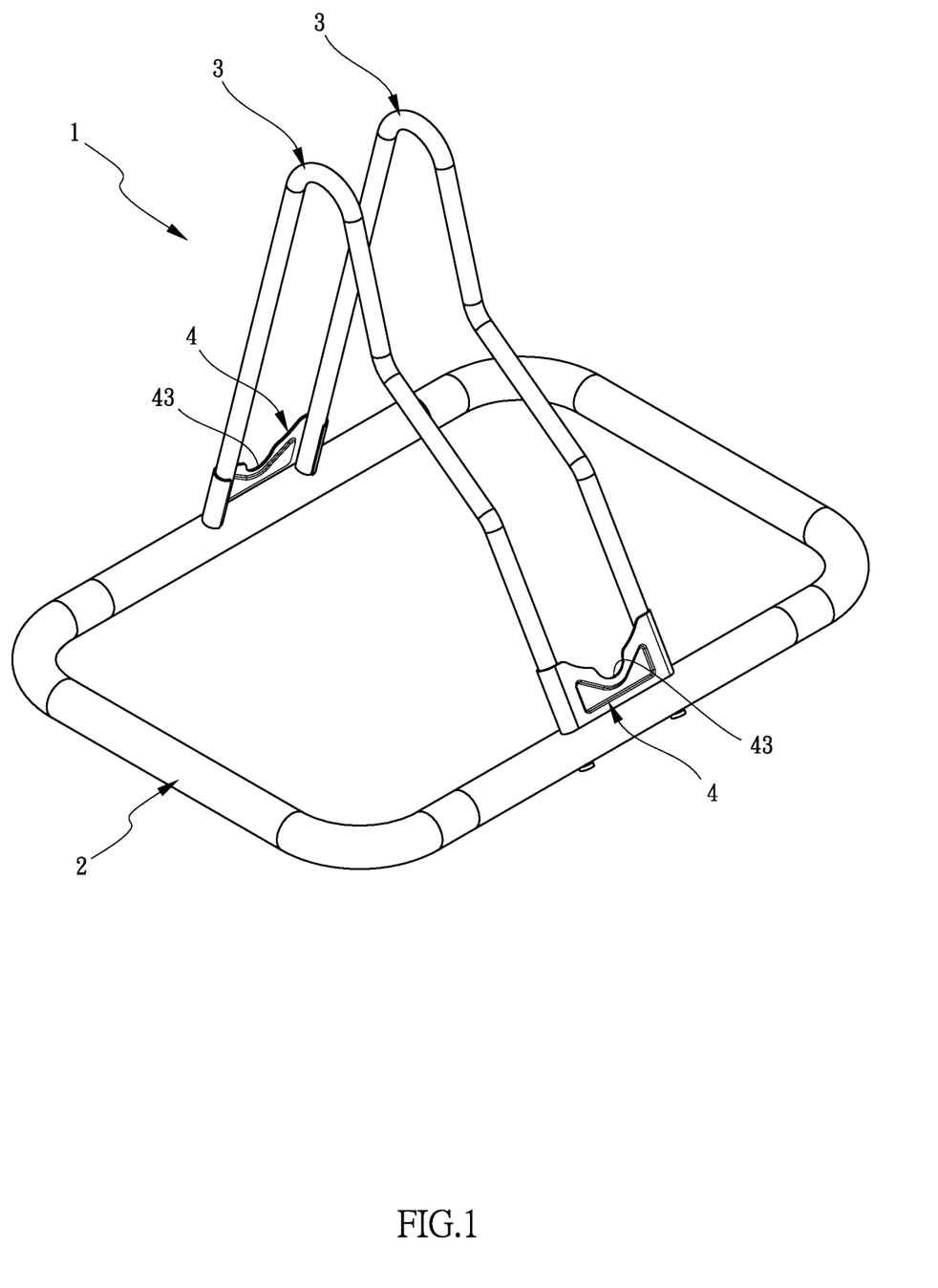
FIG. 1 is a perspective view to show the bicycle parking rack of the present invention.
Figure 2:
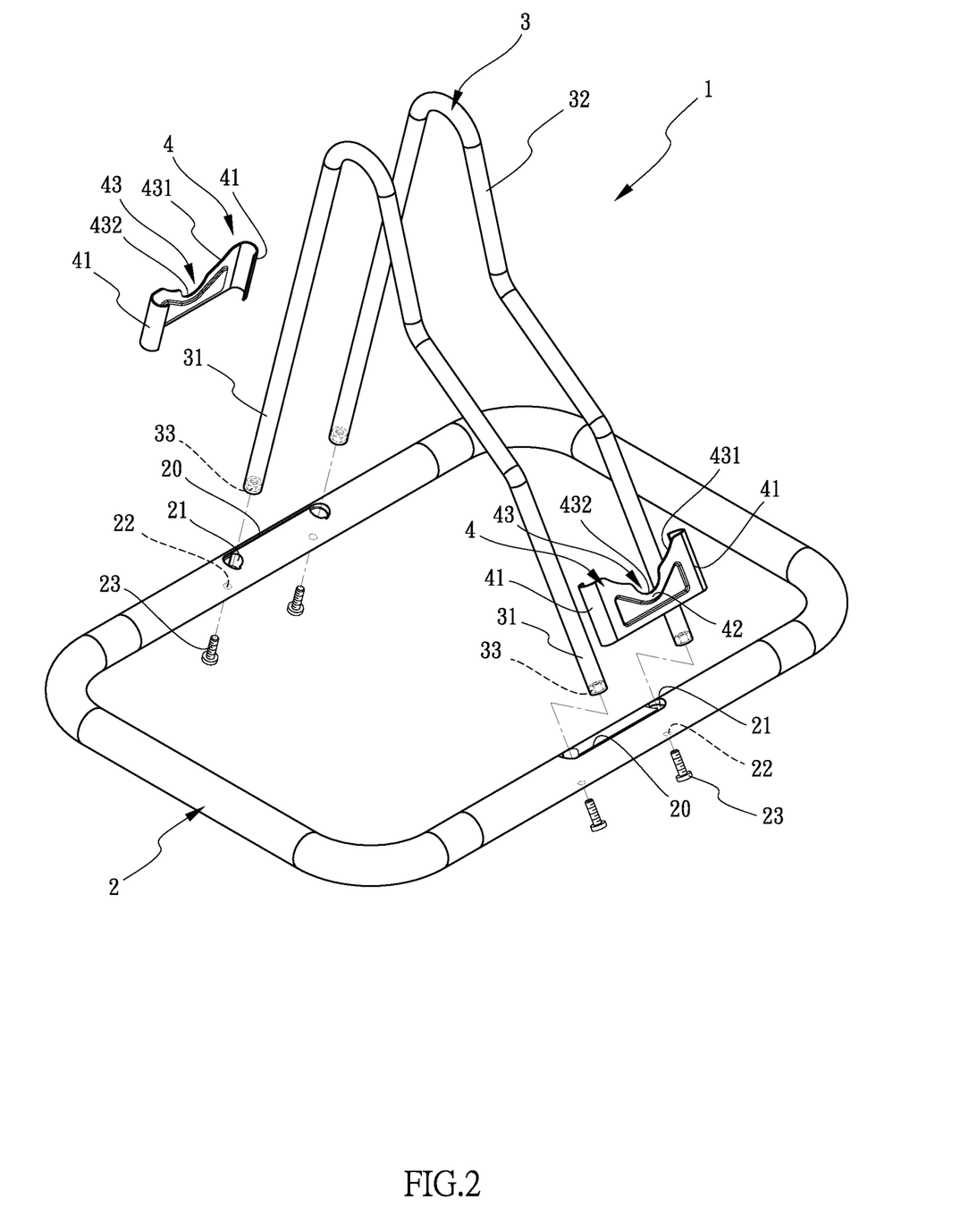
FIG. 2 is an exploded view of the bicycle parking rack of the present invention.
Figure 2A:
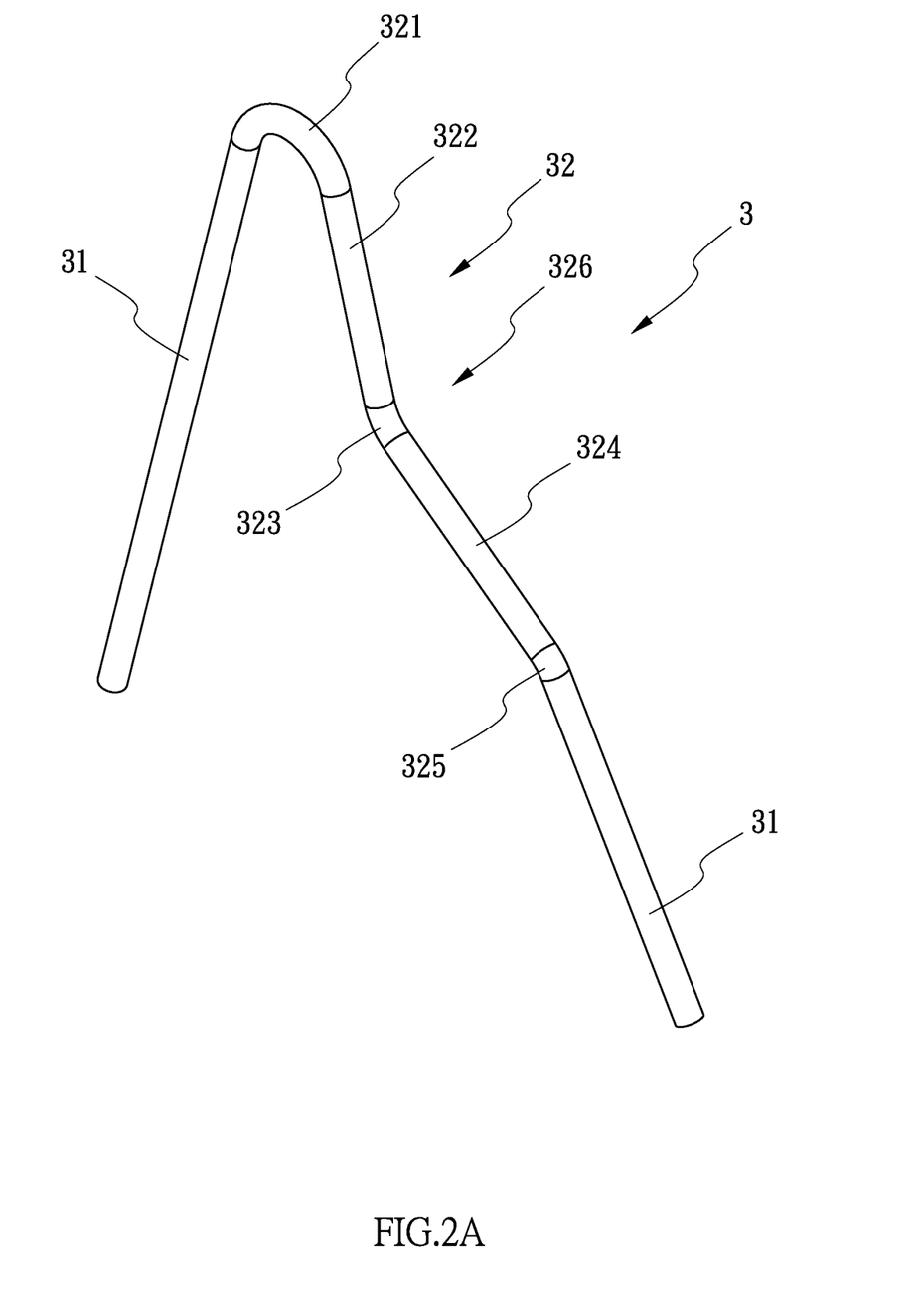
FIG. 2A shows the restriction member of the bicycle parking rack of the present invention.

Referring to FIGS. 1, 2A to 2D, 3, 4 and 4A, the bicycle parking rack 1 of the present invention comprises a base 2 and two restriction members 3 are connected to the base 2 in parallel. Each restriction member 3 includes two first sections 31 and a connection section 32 which is formed between the two first sections 31. The two first sections 31 of each restriction member 3 are connected to two opposite sides of the base 2 so that the connection section 32 of each restriction member 3 is located above the base 2. Specifically, the connection section 32 includes a first curved portion 321, a first extension portion 322, a second curved portion 323, a second extension portion 324 and a third curved portion 325. The first curved portion 321 is connected with the longer one of the two sections 31, and the third curved portion 325 is connected to the shorter one of the two sections 31. The first curved portion 321 and the second curved portion 323 are preferably curved in opposite directions. The first extension portion 322, the second curved portion 323 and the second extension portion 324 form a recessed area 326 as shown in FIG. 2A. When parking or removing bicycles relative to the bicycle parking rack 1, the recessed area 326 prevent the brake system or the quick-release of the bicycle from being hit by the connection section 32 of the restriction members 3.

In this embodiment, the base 2 is a rectangular base and composed of multiple tubes. The top face of each of the two opposite sides of the base 2 includes a slot 20 as shown in FIGS. 2 and 2D. Two fixing holes 21 are located corresponding to two ends of each of the slots 20. The bottom face of each of the two opposite sides of the base 2 includes two through holes 22 which are located corresponding to the two fixing holes 21.

Two support members 4 are respectively connected the two first sections 31 of the two restriction members 3 corresponding thereto. Each support member 4 includes a support portion 42 and two connection portions 41 which are formed on two sides of the support portion 42. The two support members 4 each are bent and curved by a plate. Each connection portion 41 is a curved portion with a passage through which one of the two restriction members 3 is inserted. A bolt 23 extends through the each of the through holes 22 and is connected to a nut 33 located in the first section 31 that is inserted into the fixing hole 21 corresponding thereto.

Figure 2B:
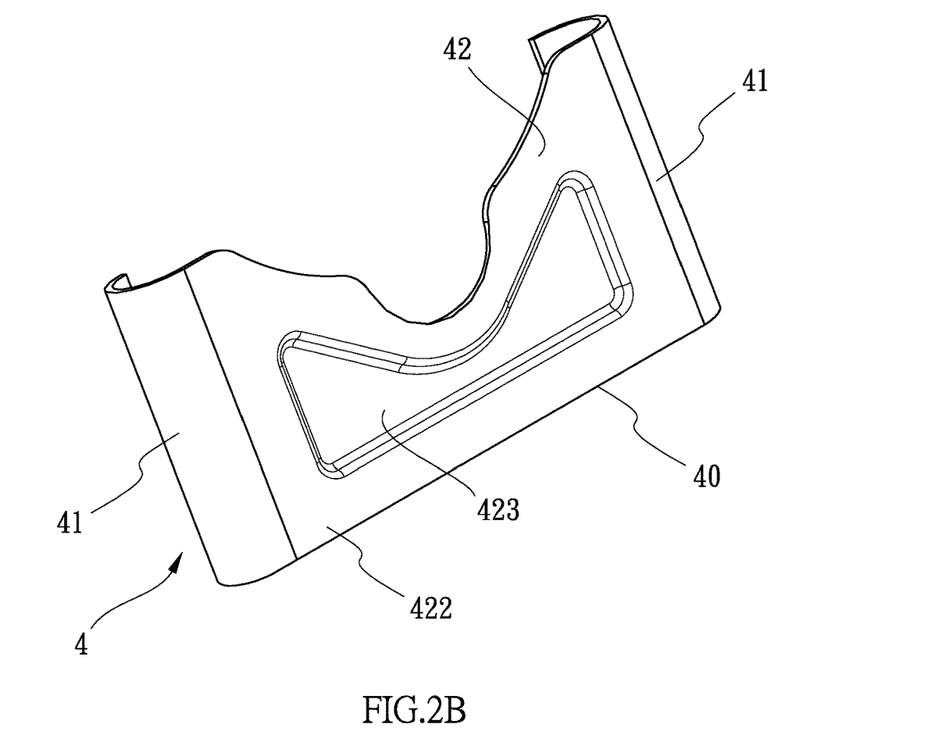
FIG. 2B is a perspective view of the support member of the bicycle parking rack of the present invention.
Figure 2C:
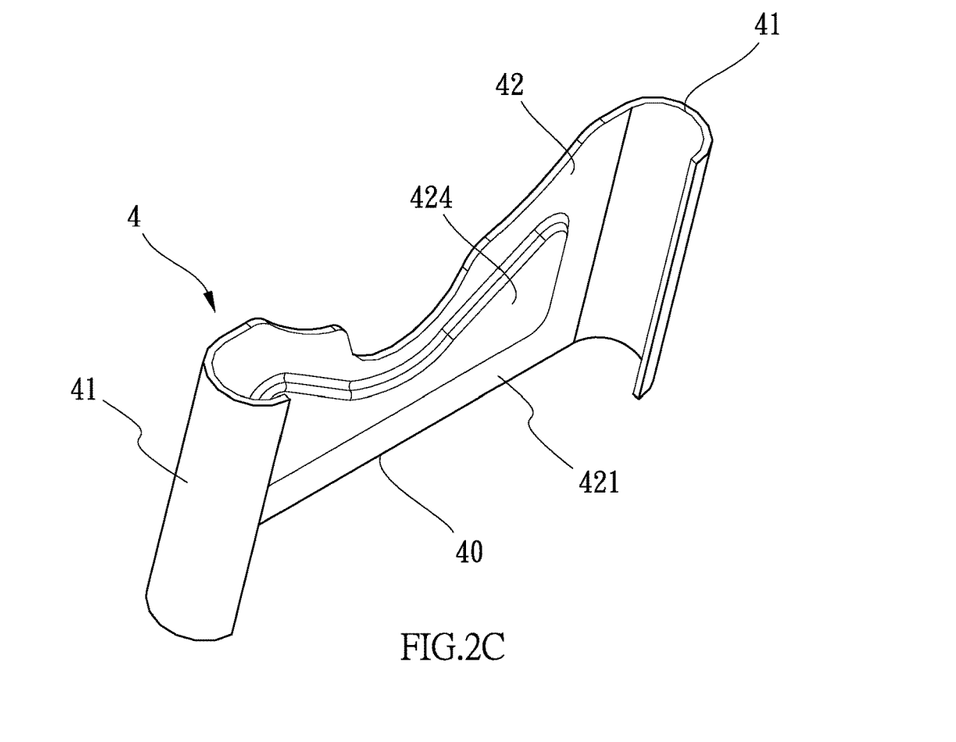
FIG. 2C shows another perspective view of the support member of the bicycle parking rack of the present invention.
Figure 2D:
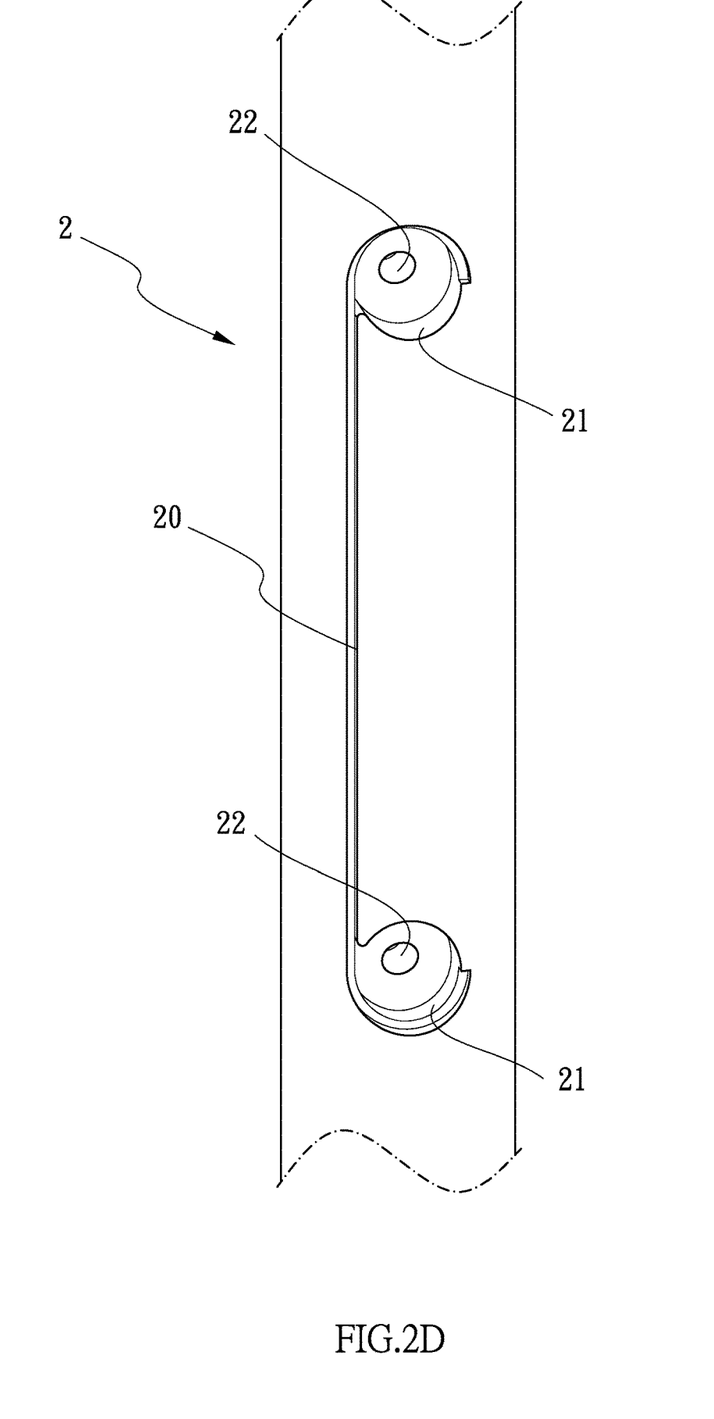
FIG. 2D is an enlarged view to show the slot of the base of the bicycle parking rack of the present invention.
Figure 4:
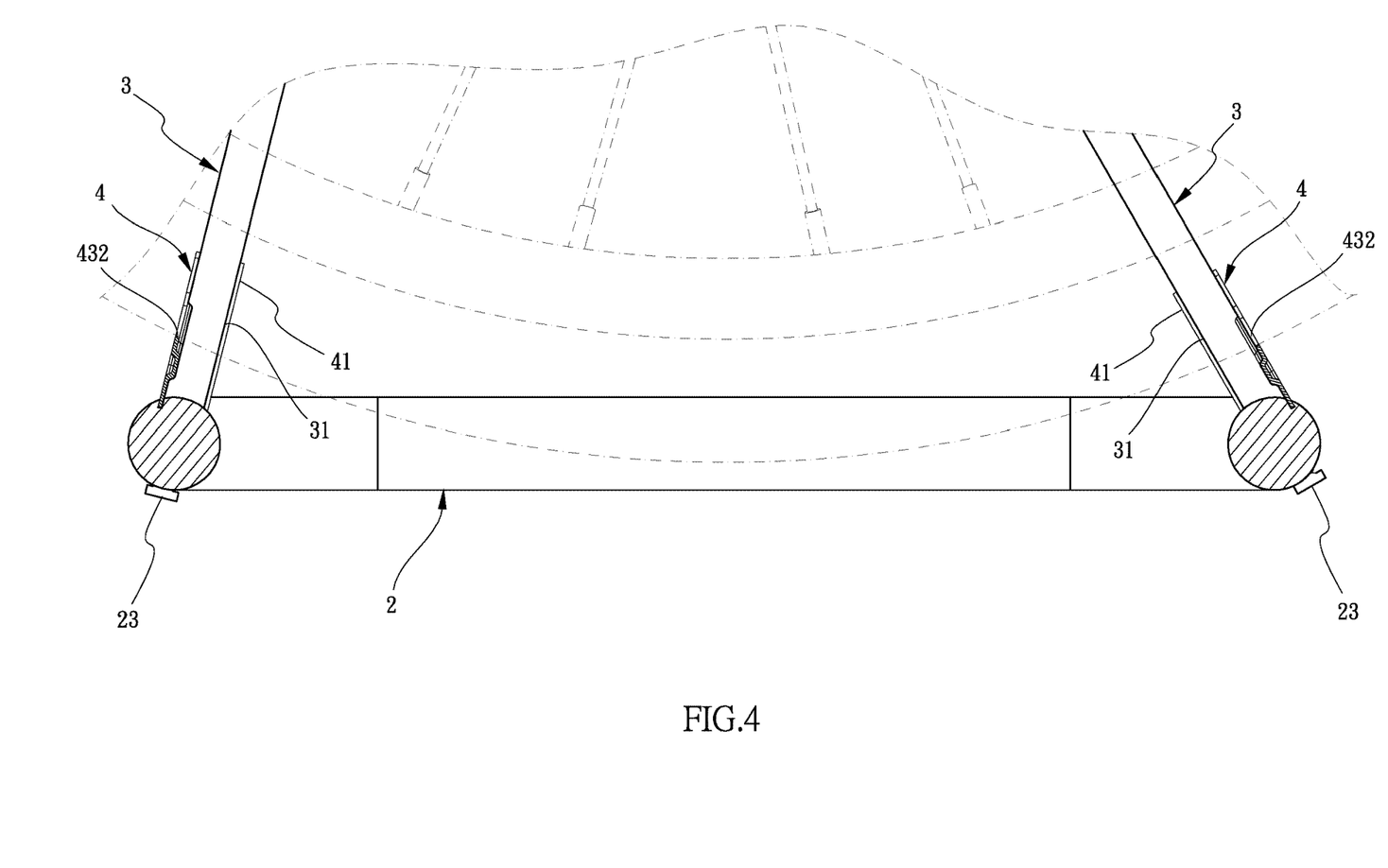
FIG. 4 is a cross sectional view, taken along line IV-IV of FIG. 3.
Figure 4A:
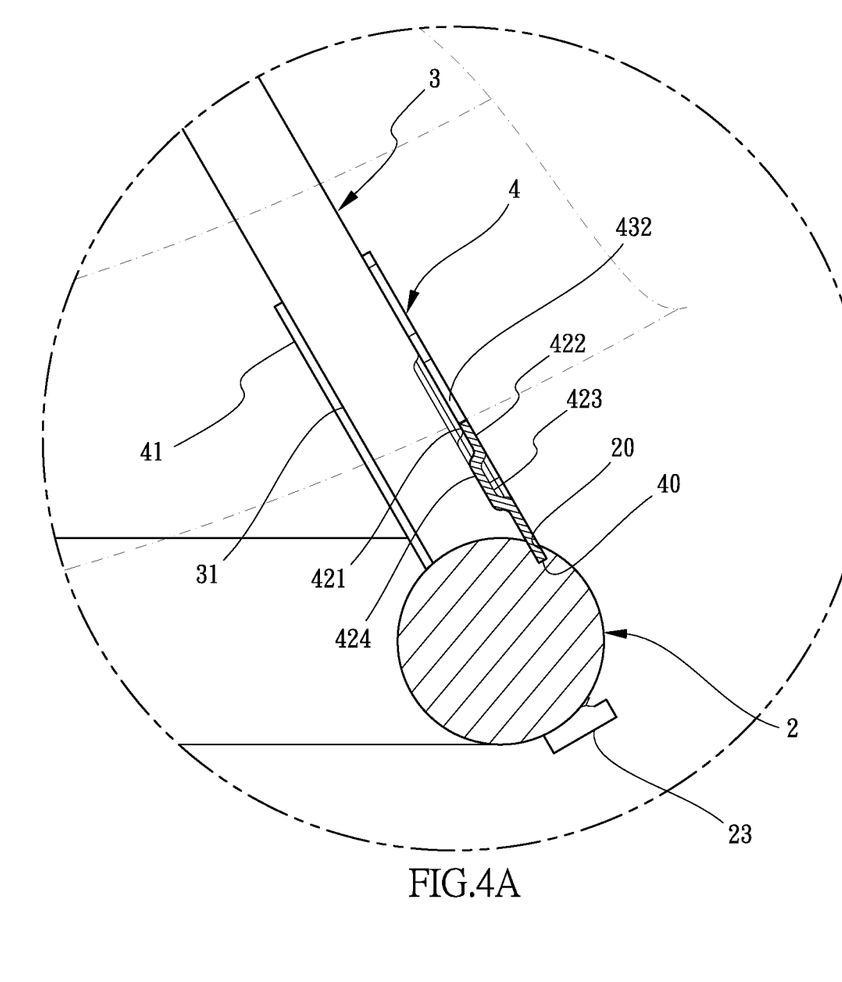
FIG. 4A is an enlarged view to show the relationship of the base, the slot and the support member of the bicycle parking rack of the present invention.

The bottom edge 40 of each of the two support members 4 as shown in FIGS. 2B and 2C is inserted into the slot 20 in the base 2 as shown in FIGS. 4 and 4A. The slots 20 make the installation of the support members 4 be easy and convenient. The bottom edge 40 contacting the base 2 shares the weight of the bicycle wheel 5 to the base 2. The support portion 42 of each support member 4 has a recess 43 which is designed to accommodate a portion of a bicycle wheel 5.

Each support member 4 includes a first face 421 and a second face 422 which is located opposite to the first face 421. The first and second faces 421, 422 are not a continuous planar face as shown in FIG. 4A to increase the strength of the support member 4. The second face 422 includes a recessed zone 423 formed in the first face 421 as shown in FIG. 2B, and the recessed zone 423 simultaneously formed a protrusion 424 from the second face 422 so as to reinforce the strength of the support member 4.

Figure 3:
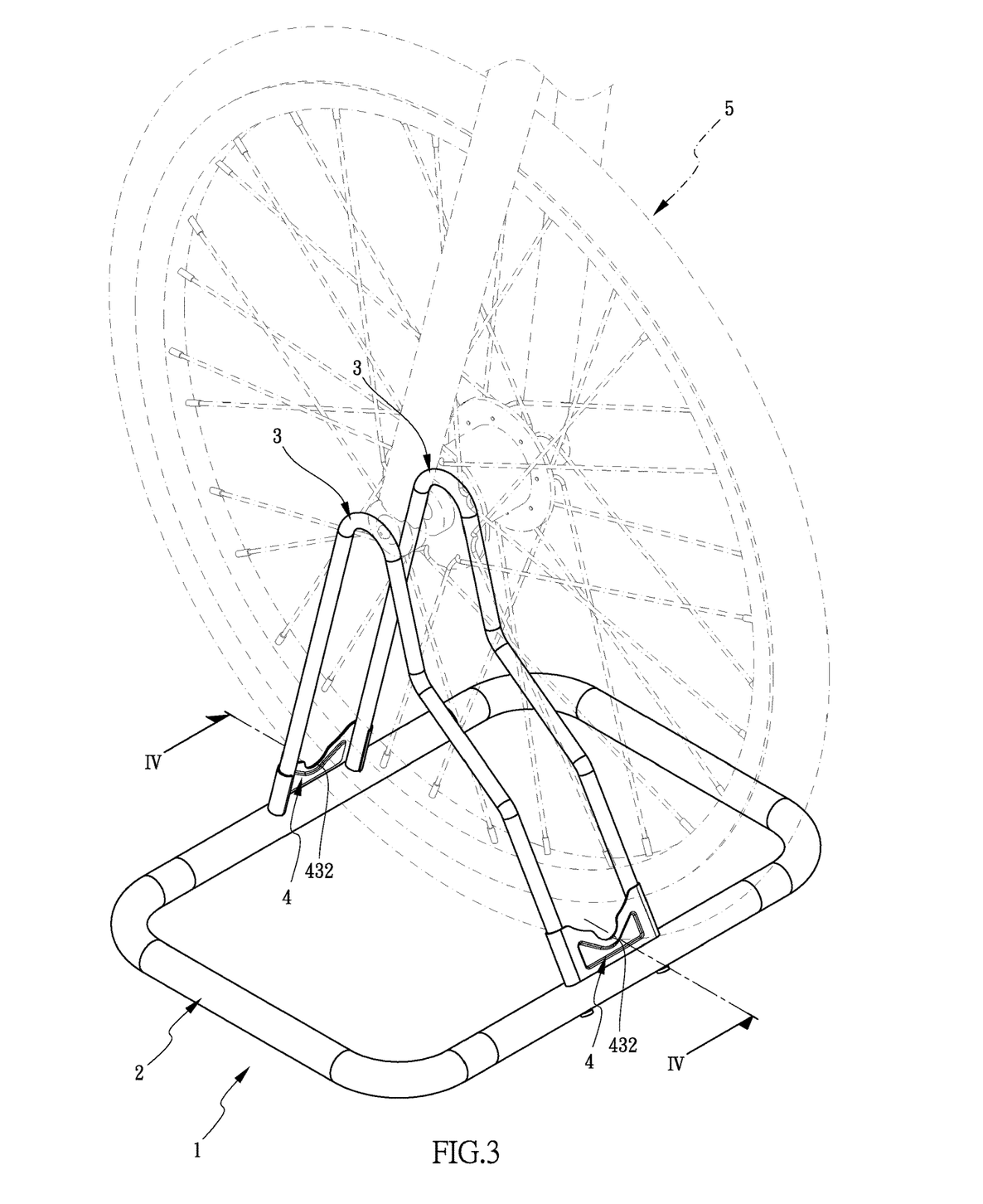
FIG. 3 illustrates a bicycle wheel is restricted by the restriction members of the bicycle parking rack of the present invention.
Figure 5:
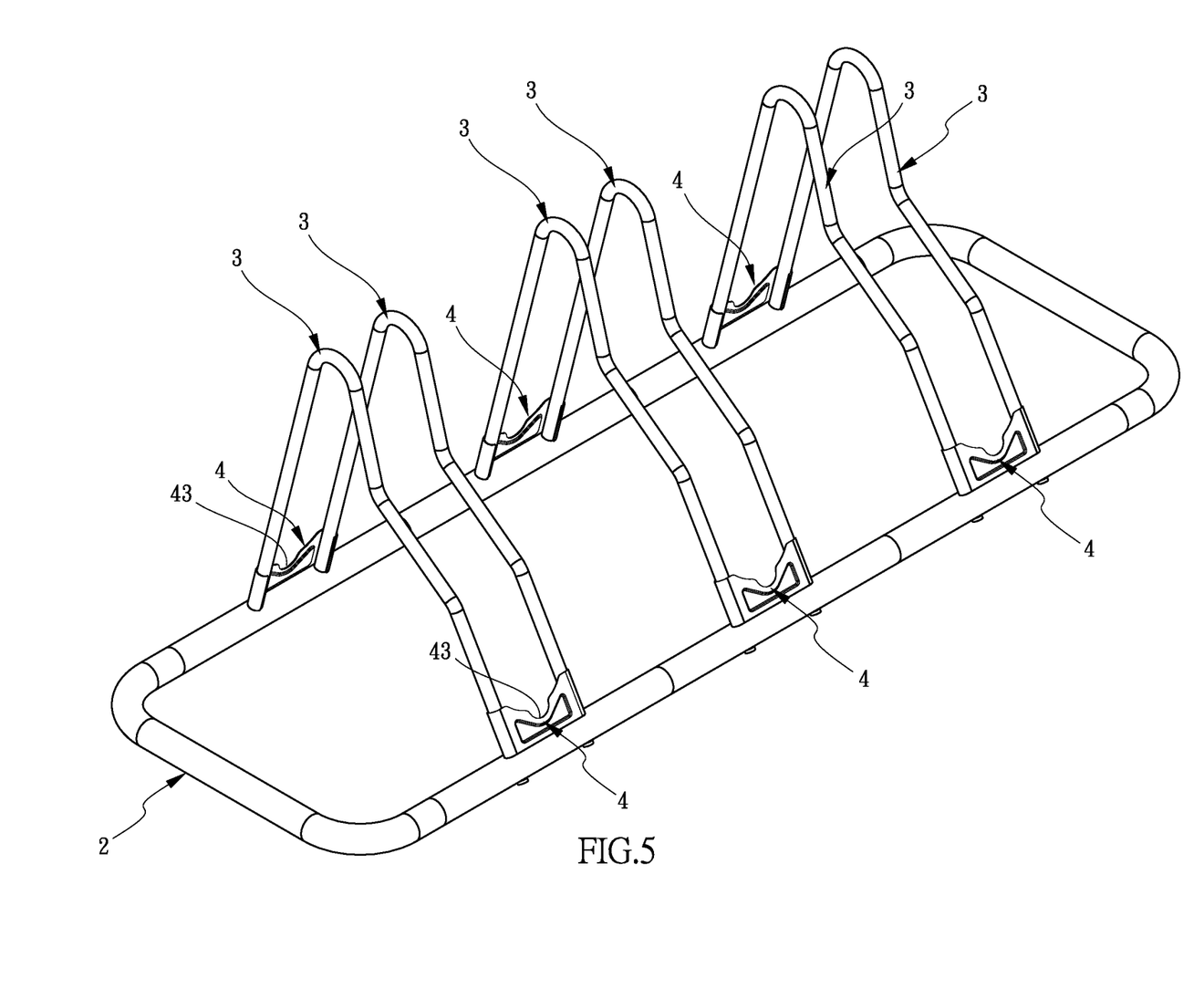
FIG. 5 shows that the bicycle parking rack of the present invention includes multiple pairs of restriction members.

In this embodiment, the recess 43 of each of the two support members 4 includes a first width recess 431 and a second width recess 432, wherein the second width recess 432 is smaller than the first width recess 431 and located at the central portion of an inner bottom of the first width recess 431. The first width recess 431 is designed for wheels of mountain bikes, and the second width recess 432 is designed for wheels of road bikes, folding bikes or cruiser bikes. FIGS. 3 and 4 show that the bicycle wheel 5 is cooperated with the second width recess 432. It is noted that the first width recess 431 and a second width recess 432 each have a non-flat inner bottom so as to properly position the bicycle wheel 5. It is noted that the bicycle wheel 5 does not contact the ground when the wheel 5 is supported on the support member 4. The base 2 is made of metal tubes which are modulated and can be easily assembled. The number of the restriction members 3 can be adjusted according to practical needs. As shown in FIG. 5, the bicycle parking rack 1 of the present invention includes three pairs of restriction members 3.

While we have shown and described the embodiment in accordance with the present invention, it should be clear to those skilled in the art that further embodiments may be made without departing from the scope of the present invention.

What is claimed is:

1. A bicycle parking rack comprising:
a base including two opposite sides, a top face of each of the two opposite sides of the base including a slot;
at least two restriction members, each restriction member including two first sections and a connection section formed between the two first sections, the two first sections of each restriction member connected to the base so that the connection section of each restriction member is located above the base, the connection section including a first curved portion, a first extension portion, a second curved portion, a second extension portion and a third curved portion, the first curved portion connected with a longer one of the two first sections, and the third curved portion connected to a shorter one of the two first sections, the first extension portion, the second curved portion and the second extension portion forming a recessed area which is adapted to prevent brake systems or the quick-releases of bicycles from being hit by the connection section of the restriction members, and
at least two support members respectively connected between the at least two restriction members, each support member including a support portion and two connection portions which are formed on two sides of the support portion, the two connection portions respectively connected to the two first sections of the at least two restriction members corresponding thereto, a bottom edge of the at least two support members inserted into a respective one of the slots in each of the opposite sides of the base and contacting the base, each support member including a first face and a second face which is located opposite to the first face, the first and second faces being not a continuous planar face, the second face including: a recessed zone formed in the first face, the recessed zone forming a protrusion from the second face so as to reinforce the strength of the support member, the support portion of each support member having a recess which is adapted to accommodate a portion of a bicycle wheel.

2. The bicycle parking rack as claimed in claim 1, wherein the at least two restriction members each are a tube, the at least two support members each are a plate, each connection portion is a curved portion with an opening through which one of the at least two restriction members is inserted.

3. The bicycle parking rack as claimed in claim 1, wherein the recess of each of the two support members includes a first width recess and a second width recess, the second width recess is smaller than the first width recess and located at a central portion of an inner bottom of the first width recess.

4. The bicycle parking rack as claimed in claim 3, wherein the first width recess and a second width recess each have a non-flat inner bottom.

5. The bicycle parking rack as claimed in claim 1, wherein two fixing holes are located at two ends of each slot corresponding thereto, and the two fixing holes each are located corresponding to a respective one of the two first sections of each of the at least two restriction members.

6. The bicycle parking rack as claimed in claim 5, wherein a bottom face of each of the opposite sides of the base includes two through holes which are located corresponding to the fixing holes, a bolt extends through each through hole and is connected to a nut located in the first section that is inserted into the fixing hole corresponding thereto.

7. The bicycle parking rack as claimed in claim 1, wherein the base is a rectangular base and composed of multiple tubes.

* * * * *